(12) United States Patent
Florence

(10) Patent No.: US 12,377,919 B1
(45) Date of Patent: Aug. 5, 2025

(54) FUEL REDUCTION ECODEVICE

(71) Applicant: Carolyn K. Florence, Boise, ID (US)

(72) Inventor: Carolyn K. Florence, Boise, ID (US)

(73) Assignee: Carolyn K. Florence, Boise, ID (US)

( * ) Notice: Subject to any disclaimer, the term of this patent is extended or adjusted under 35 U.S.C. 154(b) by 0 days.

(21) Appl. No.: 19/014,956

(22) Filed: Jan. 9, 2025

Related U.S. Application Data

(60) Provisional application No. 63/570,073, filed on Mar. 26, 2024.

(51) Int. Cl.
*B62D 35/00* (2006.01)
*B62D 35/02* (2006.01)

(52) U.S. Cl.
CPC ......... *B62D 35/001* (2013.01); *B62D 35/005* (2013.01); *B62D 35/007* (2013.01); *B62D 35/02* (2013.01)

(58) Field of Classification Search
CPC .. B62D 35/001; B62D 35/005; B62D 35/007; B62D 35/02
See application file for complete search history.

(56) References Cited

U.S. PATENT DOCUMENTS

| | | | | |
|---|---|---|---|---|
| 3,999,796 | A * | 12/1976 | Greene, Sr. | B62D 35/002 296/180.3 |
| 4,047,747 | A * | 9/1977 | Beers | B62D 35/001 296/180.3 |
| 7,517,004 | B2 * | 4/2009 | Honeycutt | B62D 35/007 296/180.1 |
| 10,730,570 | B2 * | 8/2020 | Hurst | B62D 37/02 |
| 2002/0109375 | A1 * | 8/2002 | Hung | B61D 17/02 296/180.1 |
| 2010/0090497 | A1 * | 4/2010 | Beckon | B60Q 1/44 296/180.1 |
| 2017/0080770 | A1 * | 3/2017 | Irwin | B62D 35/00 |
| 2017/0158262 | A1 * | 6/2017 | Shami | G05D 3/00 |
| 2019/0061840 | A1 * | 2/2019 | Bray | B62D 35/007 |
| 2019/0256157 | A1 * | 8/2019 | Hinterbuchinger | B62D 35/007 |
| 2021/0188373 | A1 * | 6/2021 | Chung | B62D 35/001 |
| 2024/0367731 | A1 * | 11/2024 | Kron | B62D 35/02 |

OTHER PUBLICATIONS

DE 20219455 U1 with English Translation (Year: 2003).*
KR 20150056424 A with English Translation (Year: 2015).*
Carbon Fiber Wraps: The Ultimate Guide for Car Enthusiasts (https://www.mekelin.com/blogs/news/carbon-fiber-wrap); Sep. 18, 2023 (Year: 2023).*
10 Proven Benefits of Using Cold Rolled Steel-JSW Blogs (https://www.jswonemsme.com/blogs/blogs-articles/cold-rolled-steel-in-the-automobile-industry); Feb. 20, 2023 (Year: 2023).*

* cited by examiner

*Primary Examiner* — Lori Lyjak

(57) ABSTRACT

Disclosed embodiments include a wing, or foil with or without V-wing, mounted to a vehicle in positions in disclosed embodiments to produce lift and counter a percentage of the gross weight of vehicle with or without trailer, and, thereby, improving the vehicle MPG performance.

16 Claims, 3 Drawing Sheets

FUEL REDUCTION ECODEVICE

CROSS-REFERENCE TO RELATED APPLICATIONS

This application, under 35 U.S.C. § 119, claims the benefit of U.S. Provisional Patent Application Ser. No. 63/570,073 filed on Mar. 26, 2024, and entitled "Fuel Reduction Eco-Device," the contents of which are hereby incorporated by reference herein.

FIELD OF THE DISCLOSURE

This disclosure relates generally to fuel reduction devices and methods for land vehicles. More particularly, this disclosure relates to a lift-generating wing such as, but not limited to, wing, air foil, foil or the like, (collectively, as used herein "wing"), with or without V-wing and mounted at locations optimized for air flow on a vehicle reducing the gross weight and decreasing the amount of fuel used to transport a load resulting in better miles-per-gallon (MPG).

BACKGROUND

Land-based vehicles, such as, but not limited to, semi tractor-trailers, motor homes, recreational vehicles (RVs), buses, trucks, vans, automobiles, electric vehicles, autonomous vehicles. cargo trailers, travel trailers, 5th wheel trailers, horse trailers, toy-haulers, box trailers, boat trailers, flat trailers, log trailers, and the like, (collectively, as used herein "vehicle" or "vehicles") typically require a source of power to move over the roadways on which they travel. That propulsion system may use fuel (e.g., diesel fuel, gasoline, or the like), electric power (e.g., battery pack), hydrogen, or the like. Typically, the amount of power or fuel used is influenced by factors such as gross vehicle weight, aerodynamics of the vehicle, and the like. Performance is often evaluated in terms of MPG of fuel.

To improve MPG performance of land-based vehicles, the present inventor built and installed the disclosed embodiments to improve MPG performance of a vehicle. Preliminary results of this invention show above 5% savings on MPG. Through observation of thousands of miles driven on western United States highways, no similar device has been observed anywhere on any vehicle.

Many other fuel saving devices have been developed and some are currently available in the marketplace. These devices have been studied and all produced varying results with savings of around 5% or less MPG.

Other drawbacks, inconveniences, issues, and inefficiencies of current systems and methods also exist.

SUMMARY

Accordingly, the disclosed embodiments address the above and other drawbacks, inconveniences, issues, and inefficiencies of current systems and methods.

Disclosed embodiments include a wing, with or without V-wing, mounted to vehicle in positions in disclosed embodiments to produce lift and counter a percentage of the gross weight of the vehicle, and, thereby, improving the vehicle MPG performance.

Disclosed embodiments of the Fuel Reduction Eco Device (FRED) include a wing and has an effective MPG reduction of 5% to 10%. Disclosed embodiments may also be combined with existing fuel reduction devices to further improve the MPG performance.

Disclosed embodiments of the FRED which is a wing with or without V-wing, are designed to produce enough lift to reduce the gross vehicle weight by five to ten percent of the total load weight being transported by a vehicle. This lift component increases efficiency of the propulsion system used and decreases the amount of fuel needed to propel the vehicle. The source of vehicle fuel can be diesel, gasoline, electric, hydrogen or any other fuel used to power the vehicle. Other embodiments also exist.

Figure 1:
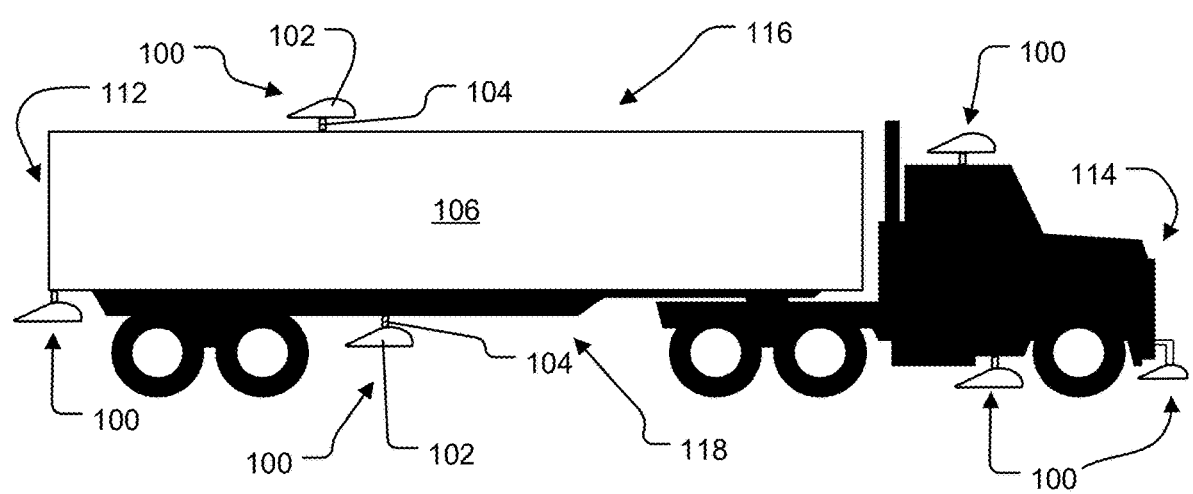
FIG. 1 is a schematic side-view of a FRED mounted on a vehicle in accordance with disclosed embodiments.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

FIG. 1 is a schematic side-view of a FRED 100 mounted on a vehicle 106 in accordance with disclosed embodiments. As illustrated, embodiments of FRED 100 include a wing 102 mounted through appropriate attachment member(s) 104 to a vehicle 106. FIG. 1 illustrates embodiments of FRED 100 may be mounted on the underside 118 of a vehicle 106, however, other mounting locations may also be used. Additionally, depending upon, among other things, vehicle size, vehicle type, availability of mounting locations, and the like, more than one FRED 100 may be installed per vehicle.

In general, embodiments of FRED 100 include a wing or airfoil 102 made of a material that is strong and resistant to damage, for example, materials could include, plastic, fiberglass, carbon fiber, composites, metals, or other suitable material.

Embodiments of FRED 100 may use any suitable shape for wing 102. For example, the particular shape of wing 102 may utilize calculations of chord, camber, and aspect ratio to determine a shape for a desired lift amount and can be used to achieve maximum lift generation depending on the length and width of the mounting space to accommodate the wing 102.

Other factors that may be included in wing 102 design include the expected normal range of the speed of the airflow, the average weight of the vehicle 106, the average weight of the load, and the like. Other factors may also be used.

As indicated in FIG. 1, wing 102 may be attached to underside 118 of vehicle 106. In some embodiments, wing 102 may be attached downwind of the air stream that will move over the wing creating lift while vehicle 106 is in motion. This lift reduces the effective weight of vehicle 106 and increases the efficiency of the propulsion system used to propel the vehicle 106.

Some embodiments install wing 102 positioned aft of the center of gravity of vehicle 106. The positioning of wing 102 also should provide a clear, unobstructed stream of air moving over and under the wing to create lift. Other embodiments are also possible.

FIG. 1 is a schematic side-view of a FRED 100 shown mounted in various locations of vehicle 106 in accordance with disclosed embodiments. As illustrated, embodiments of FRED 100 include a wing mounted with V-wing 110 with attachment members 104 to a vehicle 106. FIG. 1 illustrates embodiments of FRED 100 which may be mounted on the underside 118 and may also, however, have other mounting locations such as on the top 116 of the vehicle 106, at the rear 112 of vehicle 106, at the front 114 of vehicle 106, and other locations may also be used. Additionally, depending upon, among other things, vehicle 106 size, vehicle 106 type, availability of mounting locations, and the like, more than one FRED 100 may be installed per vehicle 106. In some embodiments, all the FRED 100 locations (e.g., 112, 114, 116, 118) may be utilized at the same time.

In some embodiments it is preferable to attach FRED 100 in a position aft of the center of gravity of vehicle 106. The positioning of wing 102 should also provide a clear, unobstructed stream of air 130 moving over and under wing 102 to create lift. Other embodiments are also possible.

Figure 2:
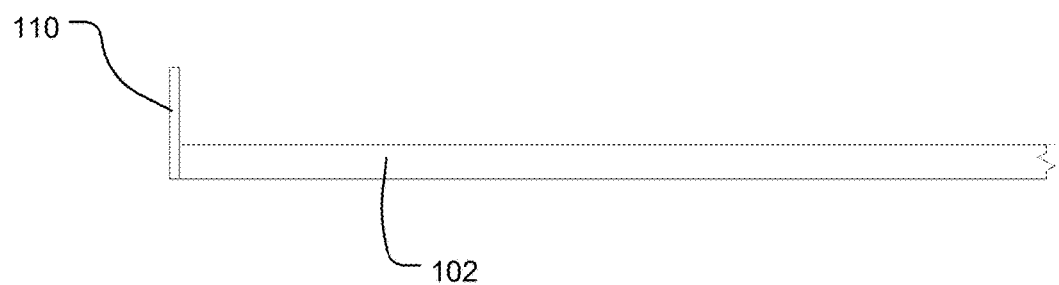
FIG. 2 is a schematic, partial front-view of a wing in accordance with disclosed embodiments.

FIG. 2 is a schematic, partial front-view of a wing 102 in accordance with disclosed embodiments. As indicated, embodiments of wing 102 may incorporate V-wing 110 on the ends of the wing 102 to, among other things, direct the wind vortex and improve lift capacity. This increased lift is captured without lengthening the wing 102, which helps generate the most lift possible without exceeding mounting space parameters and dimensions.

Figure 3:
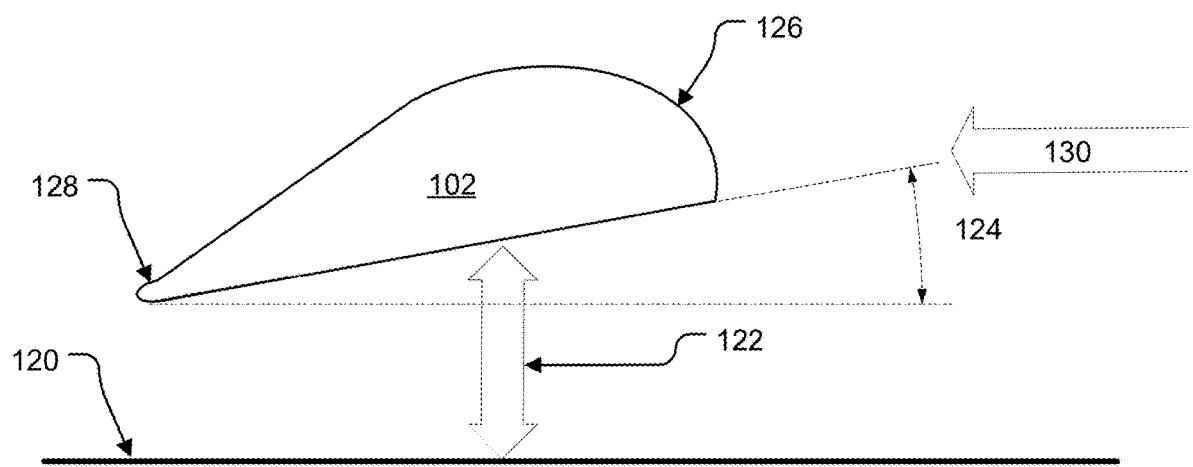
FIG. 3 is a schematic side view of a wing showing angle of attack, ground effect, and airflow in accordance with disclosed embodiments.

FIG. 3 is a schematic side view of a FRED 100 showing angle of attack 124 and airflow 130 in accordance with disclosed embodiments. Also shown are wing 102 leading edge 126 and trailing edge 128. Other factors that may be included in wing 102 design include the expected normal range of the speed of the airflow 130, the average gross weight of the vehicle 106, the average weight of any load, and the like. Other factors may also be used.

The dimensions of the wing depend upon, among other things, the load, and the space available for the FRED 100 to be attached. These dimensions may be as wide as 100 inches depending upon the width of the vehicle 106, but the wing 102 typically should not extend beyond the outer edges of the vehicle 106 to avoid, among other things, interfering with other vehicle traffic on the same road. Calculations for the width of the wing or air foil 102 are typically calculated upon the factors above, plus any other conditions that may be inherent in the particular vehicle 106.

Embodiments of FRED 100 may use any suitable shape for wing 102. For example, the particular shape of wing 102 may utilize calculations of chord, camber, center of gravity, and low aspect ratio to determine a shape for a desired lift amount and can be used to achieve maximum lift generation depending on the length and width of the mounting space to accommodate the wing 102.

For example, a low aspect ratio may be used to achieve maximum lift for the speed of the vehicle 106 at 70 miles per hour. At this constant (and typical highway) speed of air flow over the wing 102, the lift generated is enough to lift the equivalent of 5 to 10 percent of the total gross weight of the vehicle 106 and any load. In effect, the lift generated decreases the effective weight and reduces the fuel needed to power the vehicle 106 thereby, increasing the MPG.

Clean, undisturbed air flow 130 is useful for the optimizing potential of lift generated by the wing 102. The determination of the position of the wing 102 may depend on the placement of FRED 100 in the most undisturbed air flow 130 available for that vehicle 106. Other factors such as surface 120 and design of roads driven, the height of overhead obstacles and total gross weight, may also be used in the determination of the location (e.g. 112, 114, 116, 118) of a particular FRED 100.

In some embodiments, wing 102 may need 12 inches of clearance from the ground or road surface 120. The relatively small distance to the ground provides another benefit of increased lift from ground effect 122.

Embodiments of FRED 100 may be manufactured by any suitable processes that include, but are not limited to, fiberglass cloth and resin, plastic injection mold, carbon fiber wrapping, and 3D printing. The design of FRED 100 is open to utilizing many production methods and materials. As will also be apparent to those of ordinary skill in the art having the benefit of this disclosure, wing or foil 102 may be formed using a variety of internal spars, ribs, stringers, and the like, and covered with an appropriate skin.

Figure 4:
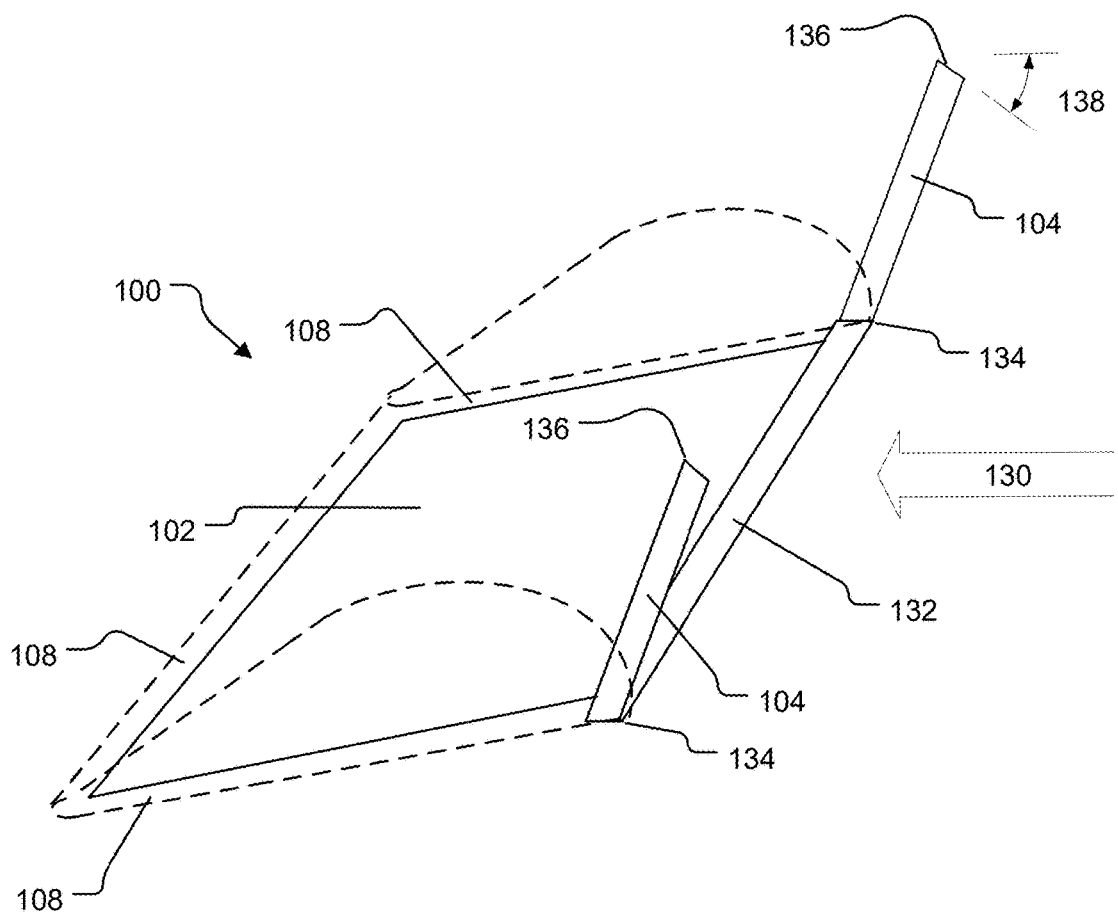
FIG. 4 is a schematic, isotropic, partially transparent side view of a FRED in accordance with disclosed embodiments.

FIG. 4 is a schematic, isotropic, side view of wing 102 with spar 132 in accordance with disclosed embodiments. In this embodiment, wing 102 is shown in phantom to see internal structures of spar 132 which may be made, for example, with ¼ inch cold rolled steel 3 inches wide. Each spar 132 may be formed or bent to an angle to create spar bend 134, for example a ninety-degree angle, on both ends of the spar 132 to form spar attachment members 104. Spar bend 134 also creates attachment points for the internal structure wingbox 108 of wing 102 assembly and also for V-wing 110, if used.

The spar tip 136 serve several functions. The spar 132 with the angle of 90 degree spar bend 134 may be welded or otherwise attached to the vehicle 106 as attachment members 104. For embodiments with spar end angle cut 138 with an angle of 12-degrees when attached to a solid flat surface (i.e., on vehicle 106) it creates the appropriate angle of attack 124 to produce lift when the minimum air flow 130 speed is reached for the wing 102.

In some embodiments, the spar 132 may be 99 inches long and the spar attachment members 104 may be 33 inches long, for a total length of 165 inches.

In some embodiments, a wingbox 108 may be assembled or otherwise formed and welded or otherwise attached to spar 132 to provide additional support for the entire wing 102 horizontal surface. In some embodiments, wingbox 108 may be formed of aluminum, composite materials, carbon-fiber, fiber glass, plastics, or the like, for a lighter weight. Embodiments of wingbox 108 may measure 96 inches by 25 inches of a rectangle.

In some embodiments, spar 132 with or without attached wingbox 108 (i.e., the complete internal structure assembly) may be placed into a mold and covered on all sides by the injection of a plastic resin or by other materials to form wing 102.

In general, embodiments of FRED 100 include a wing 102 made of a material that is strong and resistant to damage, for example, materials could include, plastic, fiberglass, carbon fiber, composites, metals, or other suitable material.

Figure 5:
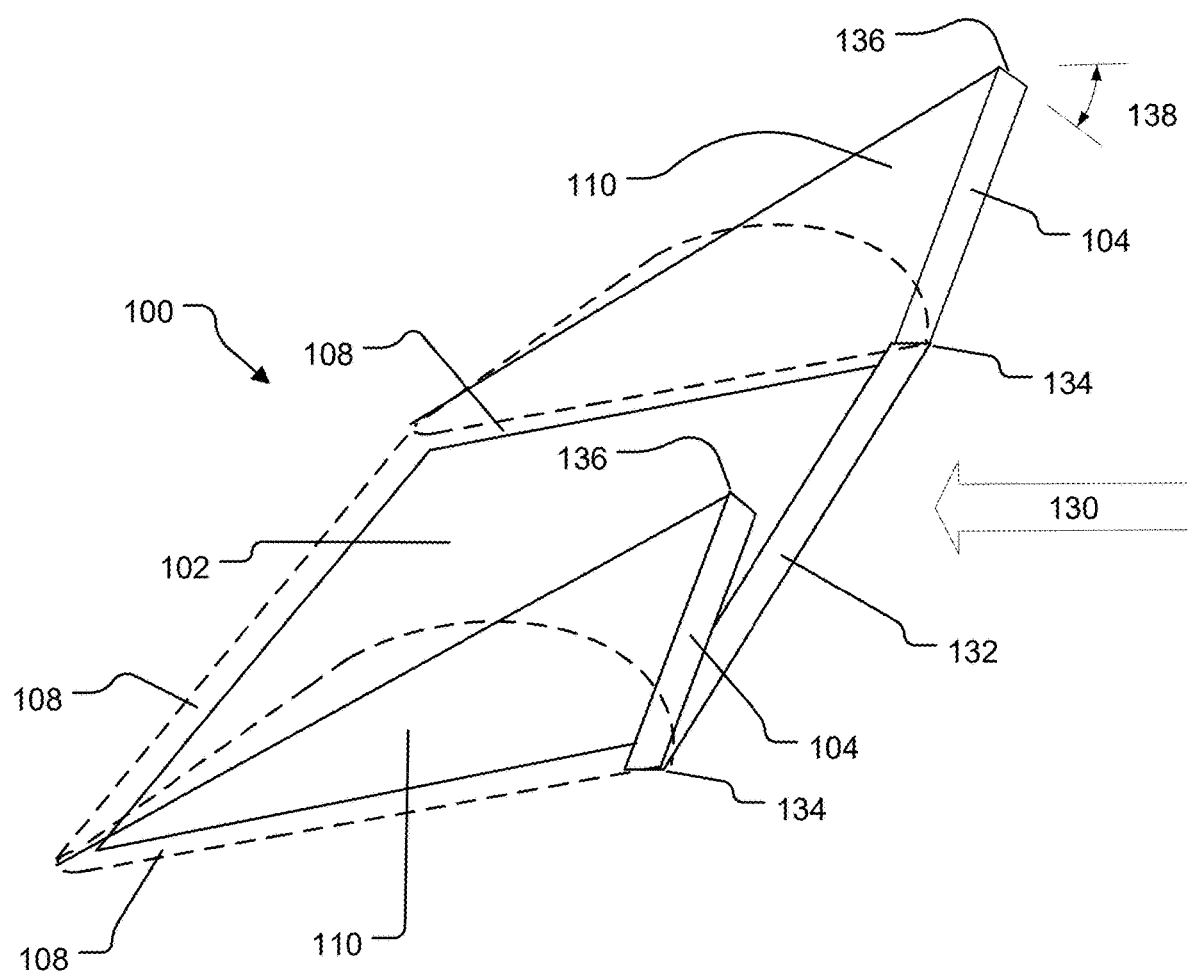
FIG. 5 is a schematic, partially transparent side-view of a FRED with V-wing attached in accordance with disclosed embodiments.

FIG. 5 is a schematic, partially transparent side-view of a wing 102 as indicated in FIG. 4 but with V-wing 110 attached in accordance with disclosed embodiments. As indicated, embodiments of wing assembly 102 may incorporate V-wing 110 on the ends of the wing 102 to increase lift component of the FRED 100 to the vehicle 106. Among other things, V-wing 110 may direct the wind vortices which improve lift capacity. Increased lift is captured without lengthening the wing 102, which helps generate the most lift possible without exceeding mounting space parameters and dimensions. Other shapes, styles, locations, and configurations of V-wing 110 may also be used.

Other factors that may be included in wing 102 design include the expected normal range of the speed of the airflow 130, the average weight of the vehicle 106, the average weight of any load, and the like. Other factors may also be used.

Although various embodiments have been shown and described, the present disclosure is not so limited and will be understood to include all such modifications and variations would be apparent to one skilled in the art.

What is claimed is:

1. A Fuel Reduction Eco-Device (FRED) comprising:
   a wing configured to be mountable on a vehicle;
   a spar coupled to the wing and configured to attach to a vehicle;
   the spar comprising a first spar bend at a first end and a second spar bend at a second end opposite the first end;
   wherein the first spar bend is opposite a first spar end angle cut and the second spar bend is opposite a second spar end angle cut; and
   wherein the first spar bend and the second spar bend form attachment members to attach the spar to a vehicle; and
   wherein the first spar angle cut and the second spar angle cut are configured to create an appropriate angle of attack to produce lift with the wing when a minimum air flow speed is reached.

2. The FRED of claim 1 further comprising:
   at least one V-wing coupled to the wing.

3. The FRED of claim 1 wherein the attachment members are configured to attach to a top of a vehicle.

4. The FRED of claim 1 wherein the attachment members are configured to attach to an underside of a vehicle.

5. The FRED of claim 1 wherein the attachment members are configured to attach to a rear of a vehicle.

6. The FRED of claim 1 wherein the attachment members are configured to attach to a front of a vehicle.

7. A system for improving the efficiency of a propulsion system used to propel a vehicle, the system comprising:
   a wing configured to produce lift and counter a percentage of a gross weight of the vehicle;
   a spar coupled to the wing and configured to attach to the vehicle;
   the spar comprising a first spar bend at a first end and a second spar bend at a second end opposite the first end;
   wherein the first spar bend is opposite a first spar end angle cut and the second spar bend is opposite a second spar end angle cut; and
   wherein the first spar bend and the second spar bend form attachment members to attach the spar to a vehicle; and
   wherein the first spar angle cut and the second spar angle cut are configured to create an appropriate angle of attack to produce lift with the wing when a minimum air flow speed is reached.

8. The system of claim 7 further comprising:
   at least one V-wing coupled to the wing.

9. The system of claim 7 wherein the attachment members are configured to attach to a top of the vehicle.

10. The system of claim 7 wherein the attachment members are configured to attach to an underside of the vehicle.

11. The system of claim 7 wherein the attachment members are configured to attach to a rear of the vehicle.

12. The system of claim 7 wherein the attachment members are configured to attach to a front of the vehicle.

13. A method of making a Fuel Reduction Eco-Device (FRED) for use on a vehicle, the method comprising:
   providing a spar comprising a first spar bend at a first end and a second spar bend at a second end opposite the first end;
   providing a first spar end angle cut opposite the first spar bend;
   providing a second spar end angle cut opposite the second spar bend; and
   wherein the first spar bend and the second spar bend form attachment members to attach the spar to a vehicle; and
   providing a wing, configured to couple to the spar; and
   wherein the first spar angle cut and the second spar angle cut are configured to create an appropriate angle of attack to produce lift with the wing when a minimum air flow speed is reached.

14. The method of claim 13 further comprising:
   providing at least one V-wing configured to be coupled to the wing.

15. The method of claim 13 wherein the wing is manufactured using plastic injection molding, carbon fiber wrapping, or 3D printing.

16. The method of claim 13 wherein the spar is manufactured using cold rolled steel.

* * * * *